Dec. 27, 1938.  H. D. HUME ET AL  2,141,300
CROP LIFTER
Filed Jan. 18, 1937  2 Sheets-Sheet 1
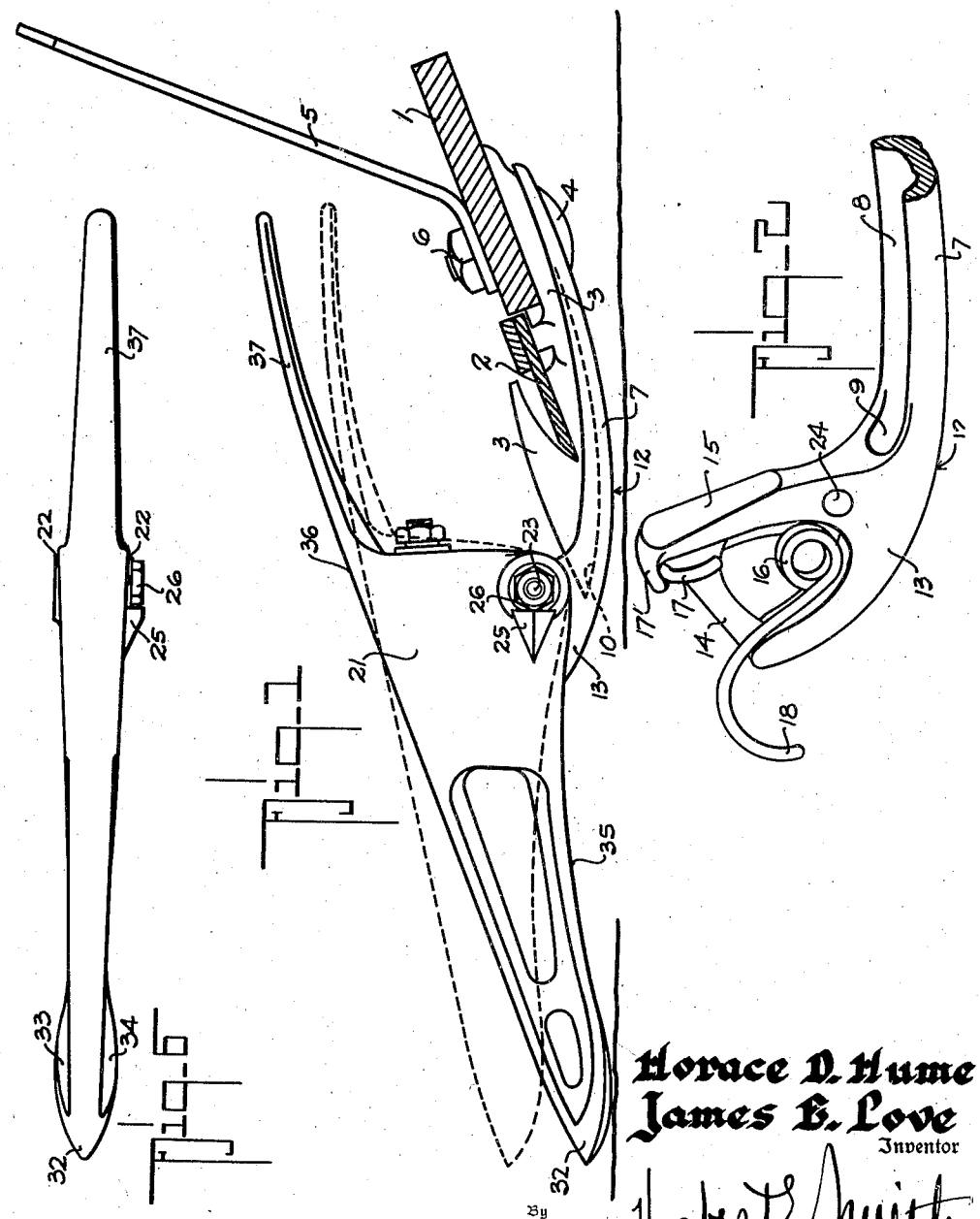
Horace D. Hume
James B. Love
Inventor
By Herbert E. Smith
Attorney

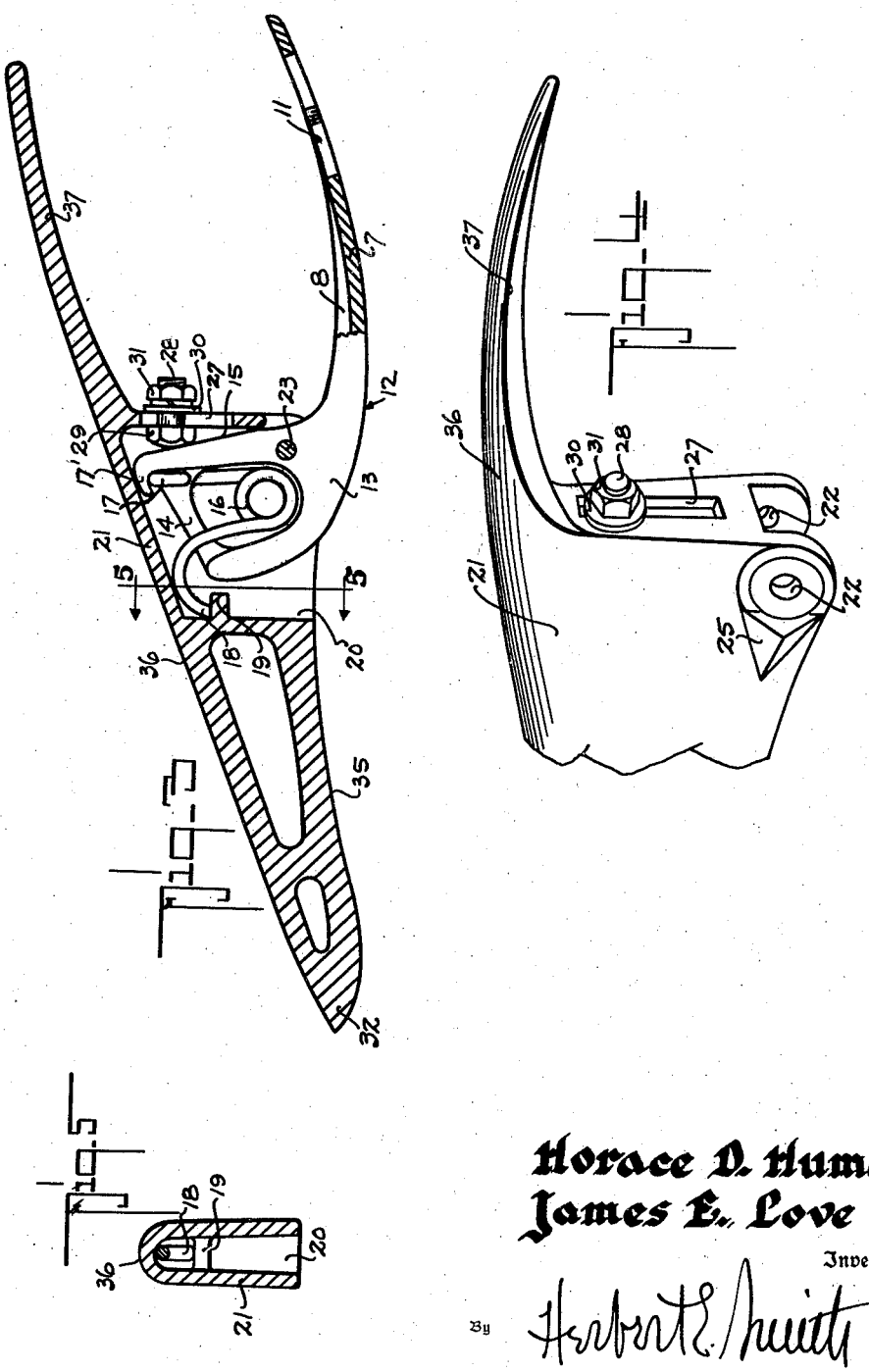

Patented Dec. 27, 1938

2,141,300

UNITED STATES PATENT OFFICE 2,141,300

CROP LIFTER

Horace D. Hume and James E. Love, Garfield, Wash., assignors to Hume-Love Company, Garfield, Wash., a corporation Application January 18, 1937, Serial No. 121,087

4 Claims. (Cl. 56—313)

Our present invention relates to improvements in crop lifters in the nature of attachments for harvesters of the mower or sickle type employing a front outwardly set, reciprocating cutter. The crop lifter is mounted as an attachment on the cutter frame of the sickle for operation in advance of the transversely arranged reciprocable cutter, for the purpose of aiding and assisting in guiding and passing the crop rearwardly to the sickle and upwardly to the usual rotary reel and draper found on this type of cutter.

The crop lifter is adapted not only for use in harvesting standing grain, but it is especially useful for harvesting down or fallen grain, vines, and other crops that lie close to the ground, and are adapted to be harvested by an implement of the sickle type.

The present invention involves a crop lifter of the type illustrated in my pending application for patent Ser. No. 66,993 filed March 4, 1936, and this invention contemplates improvements over the invention of the pending application by means of which the lifter bar or finger bar may be adjusted relatively to the ground surface and the shoe on which it is supported, and also by means of which the crop lifter may more efficiently lift, guide, and pass the vines, or other crop, back to the cutter and reel of the harvester.

The invention consists in certain novel combinations and arrangements of parts as will hereinafter be more fully set forth. In the accompanying drawings we have illustrated one complete example of the physical embodiment of our invention wherein the parts are combined and arranged according to one mode we have thus far devised for the practical application of the principles of our invention.

Figure 1 is a view in side elevation, showing the reciprocating cutter and guard in section, and indicating by dotted lines the range of adjustment of the finger bar or lifter bar.

Figure 2 is a perspective view, broken away, of the forward end of the shoe or runner illustrating its spring mounted in the recessed head of the runner.

Figure 3 is a vertical longitudinal sectional view of the crop lifter showing the interior of the housing of the finger bar, the adjusting means, and the resilient connection between the pivoted finger bar and its supporting runner.

Figure 4 is a detail perspective view at the rear end of the finger bar or lifter bar.

Figure 5 is a sectional detail view through the housing of the finger bar at line 5—5 of Figure 3.

Figure 6 is a top plan view of the finger bar or lifter bar.

In order that the general arrangement and utility of the crop lifter may readily be understood we have shown in Figure 1 the crop lifter in side elevation, and a portion of the harvester in longitudinal vertical section, which section includes the frame bar 1, the cutter bar 2, the guard 3 having a fastening bolt 4 and a brace 5 for supporting the outer or free end of the sickle.

In carrying out our invention we employ the bolt 4 and its nut 6 in connection with a runner 7, which runner has a channel 8 in its upper face, and this channel terminates in a socket 9 to receive the pointed toe 10 of the guard, which guard it will be understood is a usual part of the sickle.

In attaching the crop lifter to the mower or sickle, the channel 8 of the runner is fitted up against the under side of the shoe 3, and the socket 9 of the runner is fitted over the point or toe 10 of the guard, the runner being curved to conform to the shape of the guard. The runner near its rear end is flattened and fashioned with a bolt slot 11, through which the attaching bolt 4 is passed as well as through a bolt hole in the frame bar 1, and the nut 6 clamps the runner, shoe and bar rigidly together in order that the runner may be firmly attached to and form a rigid part with the cutter frame.

As indicated, the lower face of the runner is fashioned with a rounded out-curve 12, which rises at both the front and rear ends of the runner, and this face imparts to the runner the characteristics of a rocker or rocking face that enables the crop lifter to skim or glide over the surface of the ground or soil and conform to irregularities in the ground surface.

At its forward end the runner is fashioned with an up-turned laterally flattened, closed, U-shaped head 13, and the U-ends are rigidly joined by a cross bar 14, while the rear face 15 of the head is flattened for a considerable distance for use in adjusting the finger bar with relation to this supporting head for the finger bar. The rear face 15 of the head is formed with a hook 17' at its upper end.

Within the recess of the U-shaped head a coiled spring 16 is mounted, with one end 17 hooked over the bar 14, and its other end 18 is anchored on a flange 19 within a housing 20 located at the underside of and slightly to the rear of the longitudinal center of the finger bar or lifter bar 21 of the crop lifter.

The finger bar is mounted with its housing 20 enclosing the head 13 of the runner, and the finger bar is provided with journal bearings 22 in the side walls of the housing, for a pivot bolt 23, which bolt extends transversely through the housing and also through a bolt hole 24 extending transversely through the head 13 of the runner. An exterior guard 25 is provided on the outer side of one of the housing walls to guide the vines etc. away from the locking nut 26 that is threaded on the pivot bolt.

The finger bar, through the instrumentality of its housing and the pivot bolt 23 is mounted on the head of the runner in such manner as to prevent lateral wobbling, but the finger bar is permitted to rock in a vertical plane on its pivot bolt 23, with the spring 16 providing resilient resistance and tending to hold the finger bar in normal adjusted position. Thus the spring mounted in the recessed head with one end anchored to the head and the other end anchored to a part of the finger bar, compensates for and stabilizes the rocking movement of the finger bar, and means are provided to vary the tension of the spring for the purpose of limiting this rocking movement, and to adjust the finger bar to normal desired position with relation to the supporting head and also with relation to the ground surface.

For this purpose we provide a slot 27 in the closed back wall of the housing of the finger bar, and we provide an adjusting bolt 28 located in the slot with its head 29 within the housing and in position to bear against the flat face 15 of the runner-head.

A washer 30 and a nut 31 are mounted on the threaded end of the bolt exterior of the slotted wall of the housing, to clamp the bolt in desired position in the slot. The bolt may be adjusted within the slot 27 to move the bolt head 29 toward or away from the pivot 23 of the finger bar, and by co-action of the bolt head in frictional contact with the flat face 15 of the runner-head, the finger bar may be adjusted, and the play or range of movement of the finger bar on its pivot may be varied, to raise or lower the pointed toe 32 of the finger bar.

As best seen in Figure 6, the finger bar swells outwardly or laterally in width at 33 and 34 from the pointed toe 32, and the under face of the finger bar is fashioned with a compound curved surface 35 with its rear terminal at the housing 20, and at this point the curved face of the finger bar merges with the rocking curve 12 of the runner. By this arrangement, and with the point of the finger bar gliding over the surface of the ground, if a stone or other obstruction is encountered, the point of the finger bar can ride smoothly over the stone. The under edge 35 of the finger bar and the under edge of the runner, as 12, are convex in cross section, and because of this transverse out-curve of the parts, the encountered stone may be pushed to either side of the finger bar. Otherwise the compound curve of the finger bar merging with the rocking-curve of the runner permits the crop lifter to ride from end to end over the stone or obstruction with a smooth and facile movement, thus avoiding strains or jars being transmitted to the sickle.

The top edge 36 of the main portion of the finger bar as well as the top edge of the rear extension 37 are also rounded transversely so that the crop as it is picked up may hang loosely at both sides of the finger bar, and yet permit the finger bar to glide smoothly under the hanging crop as the latter is guided to the rear of the finger bar.

Having thus fully described our invention, what we claim and desire to secure by Letters Patent is:—

1. In a crop lifter, the combination with a runner having an upturned, recessed-head having a rear flat face, a finger bar having a housing fitted over said head, said housing having an upright slotted rear wall, a pivot bolt passing transversely through the lower part of said head and the lower part of the side walls of said housing, and a spring mounted in the recessed-head having its ends anchored respectively to the head and housing, of a bolt mounted in a slot in the slotted rear wall and slidable toward and away from the pivot bolt, a head on the bolt within the housing in frictional contact with said face, and a clamp nut on the bolt exterior of said slotted rear wall.

2. In an attachment for a harvesting machine, the combination with a frame and a shoe, a runner rigidly mounted on the shoe, and a bearing head on the runner, of a finger bar having a housing fitted over said head and pivoted in the lower part thereof, said housing having a slotted upright rear wall, a bolt mounted in the upper part of the slotted rear wall and adjustable toward and away from the pivot of the finger bar, means for securing the bolt in adjusted position, and said bolt having frictional contact with the rear face of said head.

3. In an attachment for a harvester, the combination with a supporting head and a spring mounted therein, of a finger bar pivoted on the lower part of said head and having a rear upright wall, said spring having one end anchored to the head and its other end anchored to said bar, adjusting means mounted on the upright wall of the finger bar and spaced above the pivot of the finger bar for contact with the rear face of said head, said adjusting means being movable toward and from said pivot, and means for clamping said adjusting means in selected position.

4. In a crop lifter, the combination with a supporting head having a flat rear face, and a finger bar pivotally mounted on said head and provided with a rear slotted upright wall, of an adjusting bolt mounted in the slotted wall above the pivot of the bar and having a head in frictional contact with said face whereby the bolt may be moved toward or away from the pivot of the finger bar, and a clamp nut on the bolt.

HORACE D. HUME.
JAMES E. LOVE.